(No Model.)

P. MILES.
HOOK.

No. 280,389. Patented July 3, 1883.

Witnesses:
W. H. Maginnis
Chas Collins

Inventor.
Purches Miles,
By J. A. Skilton,
Atty.

UNITED STATES PATENT OFFICE.

PURCHES MILES, OF BROOKLYN, NEW YORK.

HOOK.

SPECIFICATION forming part of Letters Patent No. 280,389, dated July 3, 1883.

Application filed August 15, 1882. (No model.)

*To all whom it may concern:*

Be it known that I, PURCHES MILES, a citizen of the United States, residing at No. 44 Ormond Place, Brooklyn, New York, have invented a new and useful Improvement in Hooks for hanging up various articles, (for which I have have obtained no foreign patent,) of which the following is a specification.

My invention relates to improvements in hooks of various kinds or classes; and the object of my improvement is to provide means whereby such hooks, having a screw-point for attaching the same, continuous with or rigidly attached to the hook, may be better adjusted and brought to a sufficiently-solid bearing. I attain this object by the mechanism illustrated in the accompanying drawings, in which—

Figure 1:
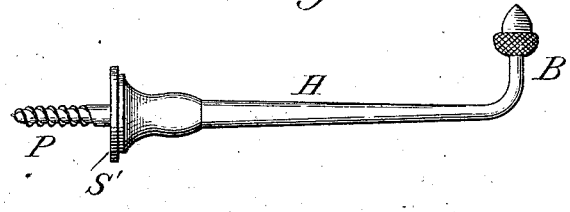
Figure 2:
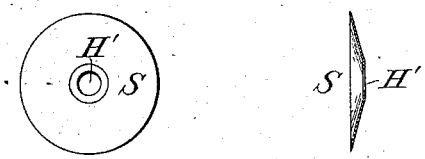
Figure 3:
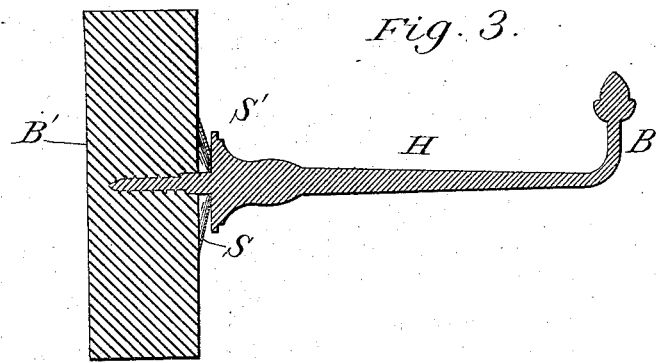

Figure 1 is a representation of a cast-metal hook and screw-point; Fig. 2, a top and sectional view of a disk-spring; and Fig. 3, a sectional view of the hook-spring, screw-point, and batten-piece.

Similar letters refer to similar parts throughout.

The hook H has a bill, B, a screw-point, P, and a shoulder, S'. The spring disk or washer S has a hole, H', to receive the screw-point P. This spring may be made of sheet metal, thin enough to yield slightly as the screw-point draws the shoulder S' to a bearing, and it may be cut through from the hole H' outward, so as to open and yield as required; or one or more slits may be cut from this hole toward the circumference of the disk without extending to the circumference.

B' is a batten or strip of wood, to which or into which the hook is screwed.

The hook is not new. The novelty, as shown in the drawings, consists in the spring applied in such relations to the hook, its bill B, its shoulder S', its screw-point P, and the batten or strip B', as to permit or to cause the compression of the spring as the shoulder approaches its bearing, and, particularly, permit such further turning of the hook as may be necessary to bring the bill of the hook into an upright position for receiving the intended dependent burden.

In the hook, as used without the spring, it has been found difficult to obtain a sufficiently-solid bearing for the shoulder S', and coincidently therewith the required upright position of the bill B. The spring disk or washer S permits this adjustment under all circumstances, since it allows the half-turn or so of the hook in either direction, as required, without depriving the shoulder S' of its requisite bearing, whereas in the absence of the spring the turning back of the hook draws out the screw far enough to cause the shoulder to leave its bearing, the hook to bend downward, and the strain or cross-strain to come mainly upon the screw alone.

The spring disk or washer may be left loose or detached from the hook, as shown; or it may be attached to the hook in any usual way that will not interfere with its action.

The shoulder S' limits the movement of the screw-point into its seat in the wood, gives a bearing for the hook, and prevents the spring from moving too far along the arm; but this shoulder may be omitted where the spring disk or washer is attached to the hook or its shank so stiffly that the washer itself furnishes the requisite stop or bearing for the hook, in which case the attachment of the washer or spring to the hook, in any ordinary manner, will be the equivalent of the shoulder.

What I claim as my invention, and desire to secure by Letters Patent, is—

A hook provided with the bill B, shoulder S', and screw-point P, in combination with the spring-washer, for the purpose set forth.

PURCHES MILES.

Witnesses:
WM. H. BUTTERWORTH,
JAMES A. SKILTON.